F. TYSON.
BRINE PRODUCER.
APPLICATION FILED JUNE 16, 1906.

903,028.

Patented Nov. 3, 1908.
2 SHEETS—SHEET 2.

Witnesses
Hamilton D. Turner
Kate A. Beadle

Inventor
Frank Tyson
by his Attorneys
Smith & Frazier

UNITED STATES PATENT OFFICE.

FRANK TYSON, OF CANTON, OHIO.

BRINE-PRODUCER.

No. 903,028.  Specification of Letters Patent.  Patented Nov. 3, 1908.

Application filed June 16, 1906. Serial No. 322,011.

*To all whom it may concern:*

Be it known that I, FRANK TYSON, a citizen of the United States, and a resident of Canton, Ohio, have invented certain Improvements in Brine-Producers, of which the following is a specification.

Figure 1:
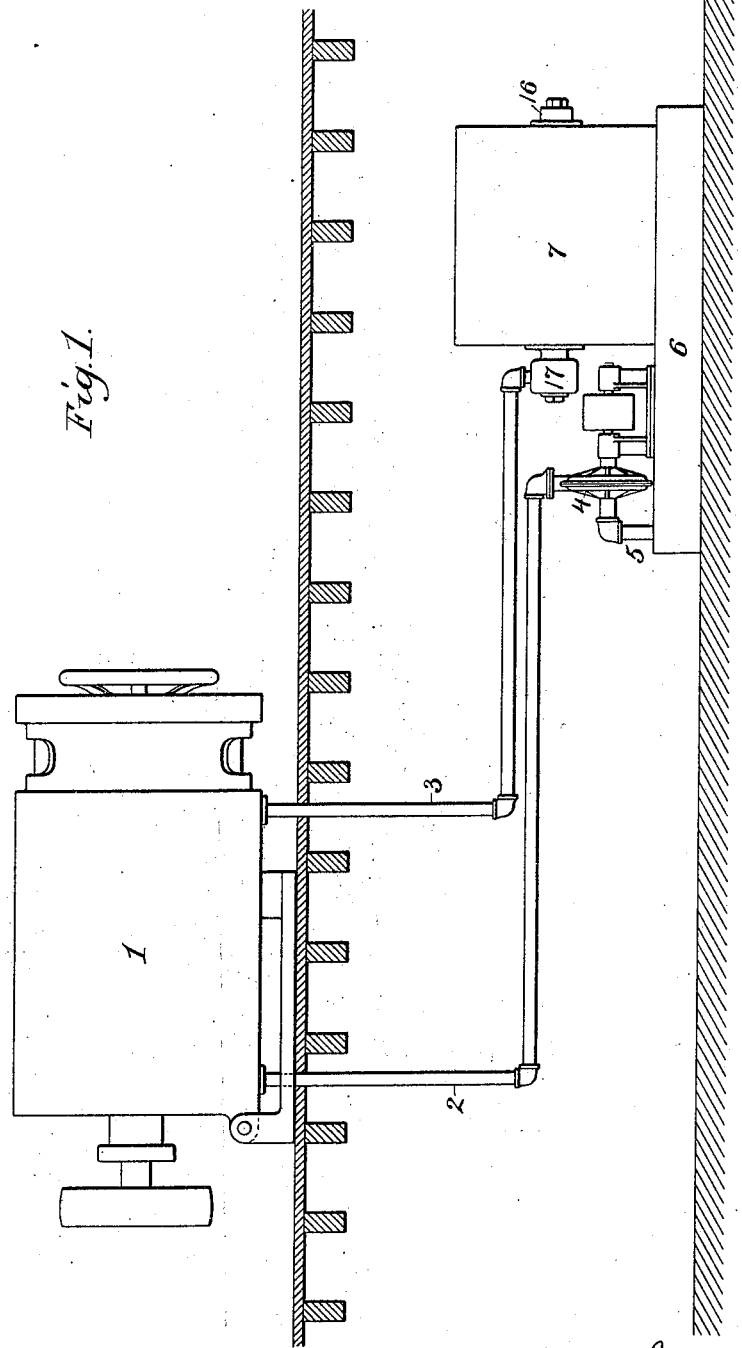
Figure 2:
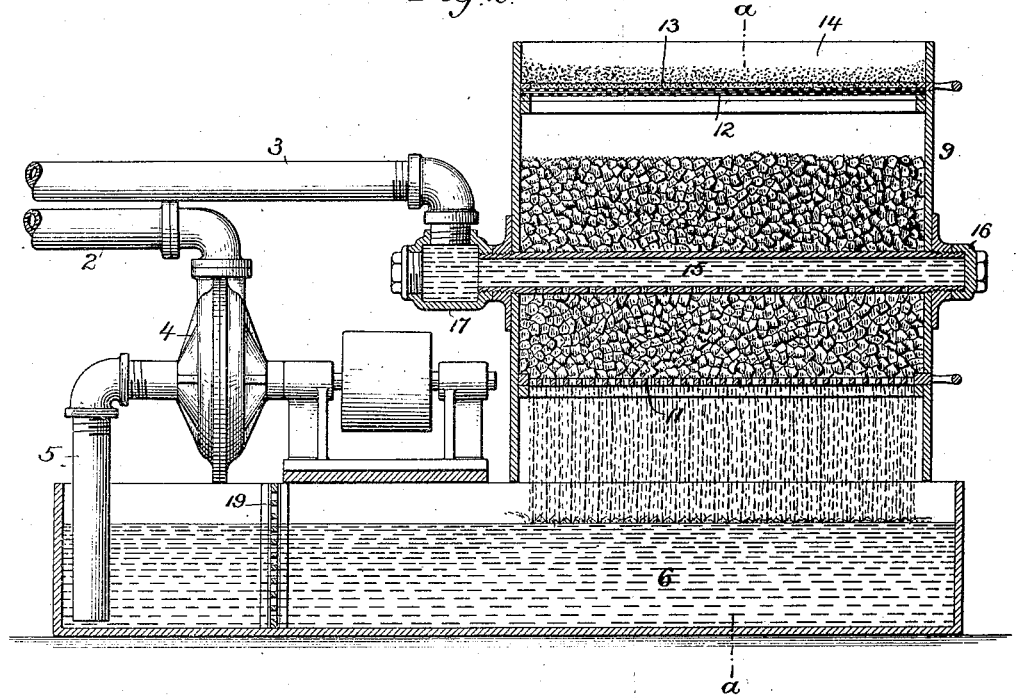
Figure 3:
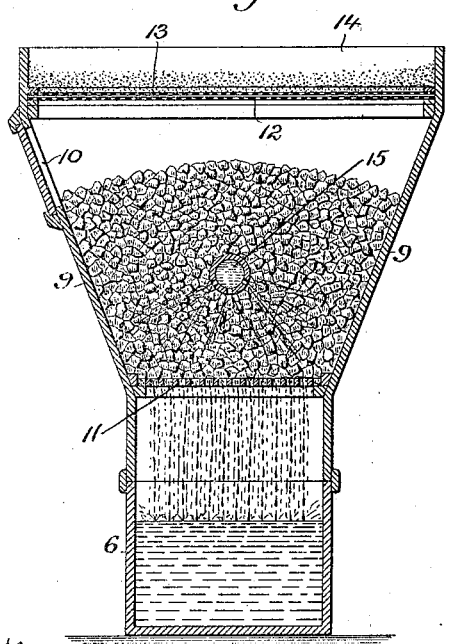

My invention consists of apparatus for the production of brine for use in power ice-cream freezers and other refrigerating devices, and is intended especially for such establishments as are not equipped with ammonia machines, or other artificial ice-making or refrigerating devices, and are therefore compelled to rely upon a purchased supply of ice, the object of my invention being to provide an apparatus whereby a supply of brine can be produced and maintained at the desired low temperature with the expenditure of a minimum amount of ice and salt. This object I attain in the manner hereinafter set forth, reference being had to the accompanying drawings, in which Figure 1 represents my improved brine producer in connection with a rotary ice cream freezer; Fig. 2 is an enlarged view, partly in longitudinal section and partly in elevation, of said brine producer, and Fig. 3 is a transverse section on the line $a$—$a$, Fig. 2.

In Fig. 1 of the drawing 1 represents an apparatus or machine in which refrigeration is to be effected; it may, for instance, be a rotary, power-driven ice-cream freezer, such as that forming the subject of my application for patent Serial No. 316,805, filed May 14, 1906, in which machine a circulation of brine is necessary for freezing purposes.

The brine supply pipe for such machine is represented at 2, and the brine discharge pipe at 3, said supply pipe being fed by a pump 4, whose suction pipe 5 communicates with a brine tank 6, upon which the brine producer 7 is suitably mounted and into which said brine producer discharges, the discharge pipe 3 of the freezer communicating with the interior of the brine producer in the manner and for the purpose hereinafter described.

The said brine producer consists of a hopper-like casing 9 for containing the supply of ice, which is introduced through a suitably closed opening 10 at one side of the casing, the bottom of the ice chamber consisting of a perforated plate 11 preferably constructed in the form of a slide in order that it may be readily withdrawn for repairs or for being cleared if it becomes clogged.

Above the ice chamber are a pair of perforated plates or screens, the upper one of which also constitutes part of a slide in order that it may be adjusted to carry its openings into or out of line with those of the lower screen and thus permit or prevent passage through the screens of a supply of salt, which is contained in a receptacle 14 above the screens, whereby the necessary amount of salt can be added to the ice whenever it becomes necessary to make such addition in order to maintain the brine at its proper strength, the amount of salt thus added being readily regulated by the manipulation of the movable screen or plate of the pair.

Passing through the ice chamber, and preferably secured to the opposite ends of the casing 9, is a pipe 15 perforated in its lower portion and closed at one end by means of a detachable cap 16 in order that ready access may be had to the interior of the pipe at any time for cleansing or other purposes.

The opposite end of the pipe has a hollow head 17 to which is connected the return pipe 8 from the freezer, and by reason of such connection the partly spent brine is returned to the ice chamber of the producer, is discharged in the form of jets or streams into the mixture of ice and salt in the lower portion of the ice chamber and is thereby recooled preparatory to flowing through the perforated plate 11 and into the tank 6, from which, after passing through a screen 19, it is returned by means of the pump 4 and pipe 2 to the freezer for further use therein.

Because of the perforated bottom of the ice chamber, the brine readily escapes therefrom, hence the ice in the lower portion of the said chamber is not covered up with brine, but is always accessible to the streams of brine issuing from the perforations of the pipe 15, these perforations being so disposed that the jets of brine are delivered not only downwardly but also laterally, and are thus caused to cover practically the entire area of the ice chamber, and, by reason of the extended area of the ice and salt with which they are brought into contact, are rapidly and effectively cooled.

It will be understood that, while the ice chamber is being charged with ice, the screen 13 is manipulated so as to mix the salt with all parts of the mass of ice which constitutes the producer charge, consequently a supply of brine of the desired low temperature and required degree of salinity can be maintained during the entire time that the apparatus is in operation, the fact that the brine returned from the freezer is still at a very low temperature, permitting the desired result to be attained with the expenditure of but a minimum amount of ice and salt.

I claim:—

1. The combination of a brine refrigerated machine, an ice-charged brine producer, means for circulating the brine through the brine chamber of the machine, and a return pipe centrally embedded in the mass of ice in the brine producer and extending in a straight line transversely through and across the brine chamber, said pipe having openings through which the brine is delivered downwardly and laterally in the form of jets.

2. A brine producer having an ice chamber, a salt receptacle and distributer above the same and a brine supply pipe discharging into the ice chamber below said salt distributer.

3. A brine producer consisting of a casing having an ice chamber therein, a salt receptacle above said chamber, and a salt distributer consisting of a pair of perforated plates or screens disposed one above the other and movable one in respect to the other, said screens constituting the bottom of the salt receptacle.

4. A brine producer having an ice chamber, a brine pipe passing through said chamber and having a perforated portion within the same, and a detachable cap applied to the end of said pipe on the outside of the ice chamber casing.

In testimony whereof, I have signed my name to this specification, in the presence of two subscribing witnesses.

FRANK TYSON.

Witnesses:
  C. M. CLENDENING,
  WM. SIMPSON.